(12) United States Patent
Yu et al.

(10) Patent No.: US 8,533,238 B2
(45) Date of Patent: Sep. 10, 2013

(54) SHARING INFORMATION ABOUT A DOCUMENT ACROSS A PRIVATE COMPUTER NETWORK

(75) Inventors: Christopher Chinwen Yu, Irvine, CA (US); Makoto Fukuda, Kawasaki (JP); Sander Martijn Viegers, Seattle, WA (US); Tsutomu Yanagida, Kawasaki (JP); Kevin Michael Morrill, Kirkland, WA (US); Sean Erik McAteer, Seattle, WA (US); Marina Dukhon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 12/113,180

(22) Filed: Apr. 30, 2008

(65) Prior Publication Data

US 2009/0276455 A1 Nov. 5, 2009

(51) Int. Cl.
*G06F 17/30* (2006.01)
(52) U.S. Cl.
USPC .......................................................... 707/805
(58) Field of Classification Search
USPC .......................................................... 707/805
See application file for complete search history.

(56) References Cited

U.S. PATENT DOCUMENTS

| | | | |
|---|---|---|---|
| 6,564,260 B1 | 5/2003 | Baber et al. | |
| 7,167,910 B2 | 1/2007 | Farnham et al. | |
| 7,188,153 B2 | 3/2007 | Lunt et al. | |
| 2002/0152279 A1 | 10/2002 | Sollenberger et al. | |
| 2005/0165785 A1 | 7/2005 | Malkin et al. | |
| 2006/0036641 A1 | 2/2006 | Brydon et al. | |
| 2006/0224675 A1 | 10/2006 | Fox et al. | |
| 2006/0242581 A1 | 10/2006 | Manion et al. | |
| 2007/0038594 A1 | 2/2007 | Goodwin | |
| 2007/0043688 A1 | 2/2007 | Kountz et al. | |
| 2007/0208751 A1* | 9/2007 | Cowan et al. | 707/10 |

OTHER PUBLICATIONS

MacManus, "IBM Launches Enterprise Social Networking Suite; Microsoft Helpfully Offers to Migrate IBM Customers Off It", Jan. 22, 2007, pp. 3.
McGarvey, "The Business Case for In-house Social Networks", 2007, Jupitermedia Corporation, pp. 4.
Rafter, "OurSpace: Create an In-House Social Network", 2007, Mansueto Ventures LLC., pp. 4.

* cited by examiner

*Primary Examiner* — Huawen Peng
(74) *Attorney, Agent, or Firm* — Hope Baldauff, LLC

(57) ABSTRACT

Technologies are described herein for providing an improved interface for interacting with a document within a private computer network. A flag interface, a tag interface, and a comment interface are provided within a document viewer. The flag interface enables a user of the private computer network to flag a document as the document is displayed by the document viewer. The tag interface enables the user to associate a tag with the document as the document is displayed by the document viewer. The comment interface enables the user to share comments about the document with other users of the private computer network as the document is displayed by the document viewer.

20 Claims, 13 Drawing Sheets

SHARING INFORMATION ABOUT A DOCUMENT ACROSS A PRIVATE COMPUTER NETWORK

BACKGROUND

As organizations have become more and more dependent upon computers, intranets and other private computer networks have been developed to internally manage and share information within the organization. An intranet is a network that is typically restricted to specific users, such as employees of an organization, and access to the intranet generally requires some form of authentication, such as a username and password. An intranet may provide access to internal files, emails, and other information stored on an enterprise server. The intranet may also be connected to other networks (e.g., the Internet) to provide access to public content that is not restricted to the users of the intranet.

In a standard implementation, an intranet is embodied in a variety of web pages. In this way, the users can access the intranet using a standard web browser. From a user's standpoint, since web browsers are already commonly used to access the Internet, the learning curve is relatively low for operating the same or a similar web browser to access the intranet. From a developer's standpoint, intranet website development is similar to Internet website development, and the development of Internet-based web pages is well-established. For example, intranet websites may also be developed using HyperText Markup Language ("HTML"), scripting languages such as JAVASCRIPT from SUN MICROSYSTEMS INC. and VIRTUAL BASIC SCRIPTING EDITION ("VBSCRIPT") from MICROSOFT COPORATION, and other suitable development tools for creating Internet websites. It should be noted that the intranet may also enable access to a variety of other documents besides web pages, such as word processing documents, spreadsheet documents, presentation documents, and the like. Access to these documents may be provided by the web browser or other suitable document viewer.

When one user of the intranet visits a web page or other document, interacting with other users of the intranet about the web page or other document can be challenging if functionality enabling the interaction is not provided by the document viewer (e.g., the web browser) or the document itself (e.g., the web page). In one example, if a user wants to mark a web page for future retrieval, the user may bookmark the web page. When a web page is bookmarked, the web address associated with the web page is saved on a local computer for use by the web browser. However, sharing bookmarks with other users can be difficult and usually requires some manual action by each user. In a "push" model, a user who created the bookmarks is required to actively distribute the bookmarks (e.g., emailing the bookmarks to other users). In a "pull" model, a user wanting to view bookmarks created by other users is required to actively retrieve bookmarks from other users.

In another example, some web pages or other documents provide functionality for associating tags with the web page or other document or adding personal comments regarding the web page or other document. A tag may be a keyword that a user may associate with a web page or other document. The tag may be utilized to categorize web pages or other documents as well as to enable a search for the web page or other document by the keyword. Functionality for associating tags with the web page or other document and commenting on the web page or other document, as well as for sharing those tags and comments with other users of the intranet, may not be provided by the web page or other document. As such, users may not be able to generate or share tags and comments about the web page. Alternatively, users may rely on an external application that is not optimized for sharing such information within the intranet. Even if users are able to generate tags, multiple tags may be generated for the same item, thereby reducing the effectiveness of tagging functionality.

When a web page or other document does not provide interactive functionality, such as functionality for adding bookmarks, tags, and comments about the document, a common approach is to access an external web page or other external application that provides such functionality. For example, a web page displaying an article may be adapted to provide a link to an external and unrelated web page that provides an interface for bookmarking the article, adding tags related to the article, and adding comments about the article. One drawback with this approach is that the interface is located on an external web page. Thus, each time a user wants to enter or view comments about the article, for example, the user may be required to leave the web page containing the article in order to access the web page containing the interface. This creates additional work for the user and also reduces the effectiveness of the interface.

It is with respect to these considerations and others that the disclosure made herein is presented.

SUMMARY

Technologies are described herein for providing an improved user interface for interacting with documents and sharing information about the documents with other users across an intranet or other private computer network. In particular, through the utilization of the technologies and concepts presented herein, a user can access an interface provided within a document viewer and utilize the interface to interact with the document. For example, the document viewer may be a web browser for viewing web pages, a word processing application for viewing text documents, a spreadsheet application for viewing spreadsheet documents, a presentation application for viewing presentation documents, or other suitable client-side document viewer. In one embodiment, the interface is provided within a document, such as within intranet web page, an Internet web page, or word processing document. In another embodiment, the interface may be provided by a document viewer, such as a standard web browser or a word processing software application. For example, the interface may be provided by the document viewer upon installing a plug-in or other suitable method.

According to embodiments, an improved interface may be provided within a document viewer. As used herein, a document viewer may include a web browser or other suitable client-side document viewer capable of accessing one or more types of documents (e.g., word processing documents, spreadsheet documents, presentation documents, etc.). The improved interface may enable a user to flag, tag, and comment on a document while viewing the document in the document viewer. When a user flags a document, a flag associating the document to the user is generated. The user may flag the document for a variety of reasons. For example, a document may be flagged because the user deems the document to be important or because the user desires to easily retrieve the document at a later time.

When a user tags a document, a tag associating a keyword with a document is generated. The user may create a new keyword or select one from a list of previously-generated keywords. Each keyword, which includes one or more words, may include arbitrary keywords and managed keywords.

Arbitrary keywords are keywords generated by users, and managed keywords are keywords generated by an organization or other entity and stored on the server.

In one embodiment, the flags, tags, and comments generated by multiple users are stored on a central server. In this way, a user with access to the server can easily share her own flags, tags and comments, as well as view flags, tags, and comments generated by other users. Further, by storing the flags, tags and comments on a central server, the organization operating the server can easily monitor and control the information being shared with the users.

In one embodiment, the flags, tags, and comments generated by one or more users are displayed in a single interface provided within a document. For example, a web page may include a dialog box that identifies users who have flagged the web page, specifies popular keywords associated with the web page, and displays comments entered by other users about the web page. By providing this interface within the document itself, the user is able to interact with other users about the document without accessing an external web page or other external application, thereby creating a more user-friendly social experience. In particular, the user can enter and share her own flags, tags, and comments about the document. Further, the user can view other users' flags, tags, and comments about the document.

According to one aspect presented herein, a computer program provides a flag interface, a tag interface, and a comment interface through a document viewer. In one embodiment, the flag interface, the tag interface, and the comment interface may be provided by altering the document to include the flag interface, the tag interface, and the comment interface within the document. In another embodiment, a document viewer plug-in may be installed on the document viewer such that the document viewer can provide the flag interface, the tag interface, and the comment interface. The flag interface enables a user of the private computer network to flag a document as the document is displayed by a document viewer. The tag interface enables the user to associate a tag with the document as the document is displayed by the document viewer. The comment interface enables the user to share comments about the document with other users of the private computer network as the document is displayed by the document viewer.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
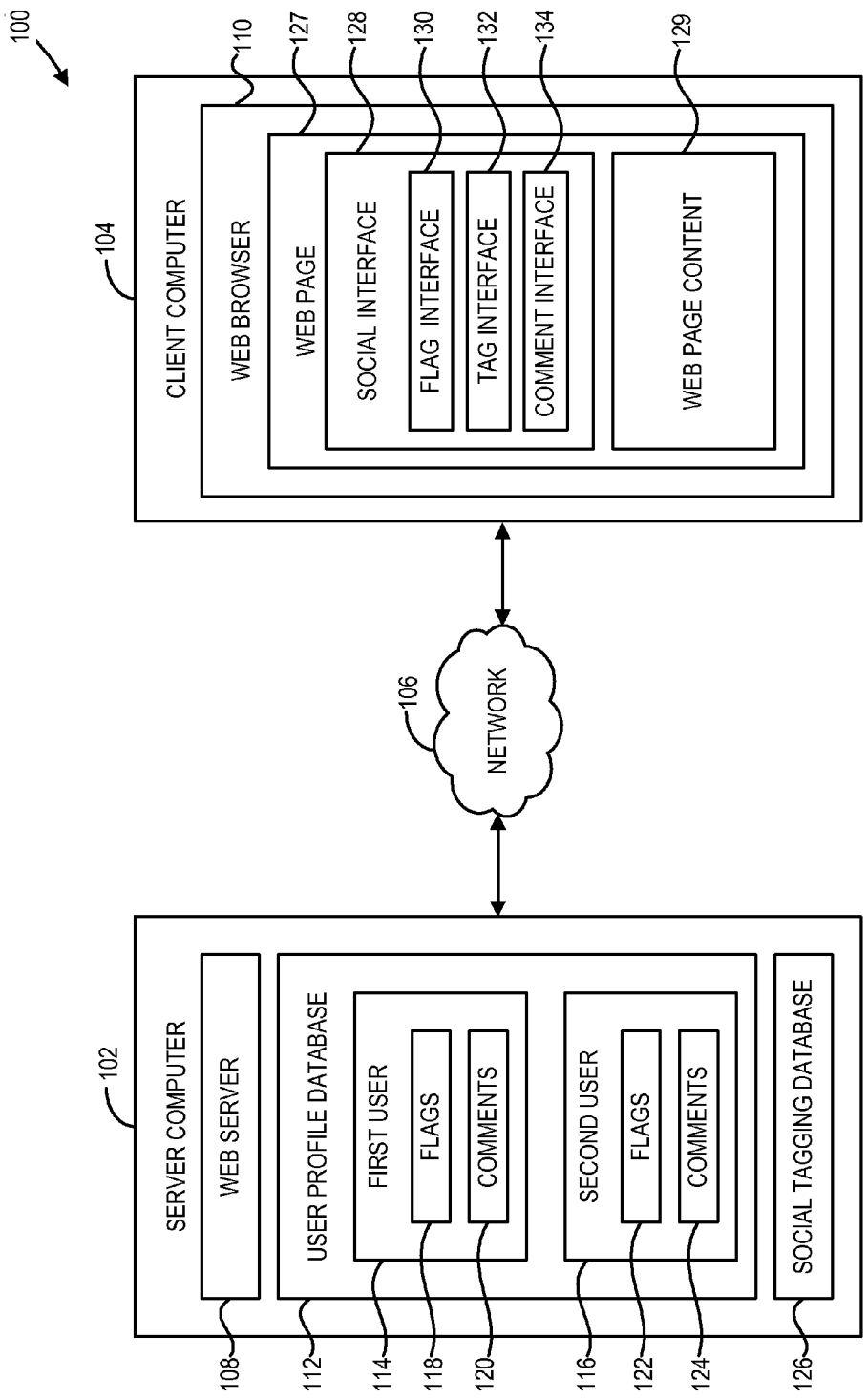
FIG. 1 is a network architecture diagram showing aspects of a network architecture capable of providing an improved user interface enabling users to interact with documents and to share information about the documents with other users across a private computer network, in accordance with one embodiment.

The following detailed description is directed to technologies for interacting with documents and sharing information about the documents with other users across an intranet or other private computer network. Through the utilization of the technologies and concepts presented herein, a user can access an interface provided within a document viewer and utilize the interface to interact with the document. For example, the document viewer may be a web browser for viewing web pages, a word processing application for viewing text documents, or other suitable document viewer. In one embodiment, the interface is provided within a document, such as within intranet web page, an Internet web page, or a word processing document. In another embodiment, the interface may be provided by a document viewer, such as a standard web browser or a word processing software application. For example, the interface may be provided by the document viewer upon installing a plug-in or other suitable method.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

For purposes of illustration, the embodiments described herein primarily refer to a web browser as an exemplary implementation of a document viewer, and a web page as an exemplary implementation of a document. The web browser may be configured to view private web pages over an intranet as well as publicly-accessible web pages over the Internet. Other client-side document viewers, such as word processing applications, spreadsheet applications, presentation applications, and the like, may be similarly utilized. Documents may include, but are not limited to, web pages, text documents, spreadsheet documents, and presentation documents. Examples of client-side document viewers for viewing word processing applications include WORD from MICROSOFT CORPORATION, PAGES from APPLE INC., and LOTUS WORD PRO from INTERNATIONAL BUSINESS MACHINES CORPORATION. Examples of client-side document viewers for viewing spreadsheet applications include EXCEL from MICROSOFT CORPORATION and NUMBERS from APPLE INC. Examples of client-side document viewers for viewing presentation documents include POWERPOINT from MICROSOFT CORPORATION and KEYNOTE from APPLE INC.

Standard web browsers typically provide a bookmark functionality whereby a user can save a web address for future reference. The bookmarks are usually saved on only one web browser. For example, a first user can save her bookmarks on a web browser on her computer. In order for the first user to share her bookmarks with a second user on a private computer network, such as an intranet, the first user can manually export the bookmarks to a bookmark file, which contains the bookmarks in a readable format. Upon creating the bookmark file, the first user may email the bookmark file to the second user, and the second user can access the bookmark file to view the first user's bookmarks.

This conventional method for sharing bookmarks has drawbacks for both the first user and the second user. The first user has the responsibility of exporting the bookmarks and emailing the bookmark file to other users, such as the second user. The second user has the responsibility of managing bookmark files for potentially numerous private computer network users, such as the first user. Providing this much responsibility to the first user and the second user reduces the users' overall experience and increases the users' potential frustration.

Further, standard web browsers generally do not provide functionality for tagging or commenting on individual web pages. This functionality, if provided at all, is generally provided directly on the web page. For existing web pages, adding tagging and commenting functionality for each web page may involve a significant amount of work. Even if tagging and commenting is provided on a web page, additional functionality for easily sharing and commenting on the web page across the private computer network may not be provided. For example, web pages generally do not distinguish comments between different types of users. As such, comments made by private computer network users on an Internet page may not be easily distinguished from comments made by other Internet users.

Embodiments described herein provide a user interface that enables a user to flag, tag, and comment on any given web page and easily share the flags, tags, and comments with other users across a private computer network. This interface is referred to herein as a social interface. In one embodiment, the social interface is provided as part of a web page. In particular, the web page may be altered or manipulated in any suitable manner to incorporate the social interface. For example, the social interface may be placed in a hypertext markup language ("HTML") frame. In another embodiment, the social interface is provided by a web browser. For example, a browser plug-in may be installed on a standard web browser to add the social interface to the web browser.

It should be appreciated that the social interface is provided independently of web page content, so even existing web pages can be flagged, tagged, and commented on without any changes in design. In particular, the flagging, tagging, and commenting functionality provided the social interface may be implemented and managed via an intranet web server software application or other suitable private computer network software application executing on a central server.

The social interface also provides a single destination in which to view flags, tags, and comments from other users. In this way, a user can quickly determine, among other things, how popular the web page is, what the latest news about the web page is, and which users are commenting about the web page. The ability for a user to digest, at a single destination, this vast amount of relevant information from other users about a web page provides a much richer viewing experience than simply viewing the web page in the abstract.

In the following detailed description, references are made to the accompanying drawings that form a part hereof, and which are shown by way of illustration, specific embodiments, or examples. Referring now to the drawings, in which like numerals represent like elements through the several figures, aspects of a computing system and methodology for providing an improved user interface for interacting with web pages and sharing information about the web pages with other users across a private computer network will be described. Turning to FIG. 1, additional details will be provided regarding an implementation of a social interface adapted to enable a user to flag, tag, and comment on any web page as well as to view flags, tags, and comments generated by other users. In particular, FIG. 1 shows aspects of a system 100 including a server computer 102 and a client computer 104 operatively connected via a network 106. In one embodiment, the server computer 102 is an enterprise server and the network 106 is a private computer network, such as an intranet. As used herein, a private computer network refers to a computer network which restricts access to only a limited number of users. The network 106 may be any suitable private computer network as contemplated by those skilled in the art. The network 106 may also be operatively connected to other suitable networks, such as the Internet. In this way, the private computer network may be used to access documents and other content stored within the private computer network, as well as publicly-accessible documents and content that are outside the private computer network.

In one embodiment, the server computer 102 is a standard computer system capable of executing an operating system and one or more application programs. In particular, the server computer 102 executes a web server application (hereinafter "web server") 108, which enables the client computer 104 to access the server computer 102 via a web browser application (hereinafter "web browser") 110. The web server 108 may also perform an authorization function (e.g., by requesting a username and password) in order to verify that a given user of the client computer 104 is authorized to access the server computer 102.

The web server 108 may be configured to accept data requests from the client computer 104 to the server computer 102, and to transmit data responses from the server computer 102 to the client computer 104. These data requests and responses may be transmitted via any suitable protocol, such as hypertext transfer protocol ("HTTP"), file transfer protocol ("FTP"), real-time streaming protocol ("RTSP"), hypertext transfer protocol over secure socket layer ("HTTPS"), and the like. In one embodiment, the web server 108 is an intranet web server. In other embodiments, the web server 108 may be any suitable web server.

The server computer 102 further includes a user profile database 112, which includes data storage associated with multiple users, and a social tagging database 126 for storing tags created by the multiple users. In particular, FIG. 1 illustrates a first user storage 114 for storing content associated with a first user and a second user storage 116 for storing content associated with a second user. The first user storage 114 includes a first flag storage 118 for storing flags associated with the first user and a first comment storage 120 for storing comments associated with the first user. Similarly, the second user storage 116 includes a second flag storage 122 for storing flags associated with the second user and a second comment storage 124 for storing comments associated with the second user. The social tagging database 126 may also associated tags with the users who specified the tags. It should be appreciated that the user profile database 112 and the social tagging database 126 may be combined into a single database. Further, the information contained in the user profile database 112 and the social tagging database 126 may be divided into other database configurations, as contemplated by those skilled in the art. Additional details regarding the implementation and applicability of flags, tags, and comments will be provided below.

In one embodiment, the client computer 104 is a standard desktop or laptop computer system capable of executing an operating system and one or more application programs. It should be appreciated, however, that in other embodiments the client computer 104 may be another type of computing device. For instance, according to embodiments, the client computer 104 may be a mobile computing device, such as a mobile telephone, a smartphone, an ultra-mobile personal computer, a tablet personal computer, or other suitable mobile computing device. Other devices may also be utilized in a similar manner.

According to embodiments, the client computer 104 is operative to execute a web browser application (hereinafter "web browser") 110 and other suitable applications. The web browser 110 may be any standard web browser adapted to access a variety of content, including web pages, over the network 106. In particular, the web browser 110 may be adapted to view intranet-based web pages provided by the server computer 102, as well as Internet-based web pages provided by over the Internet. The web browser 110 may access the content via any suitable transmission protocols, such as HTTP, FTP, RTSP, HTTPS, and the like.

As illustrated in FIG. 1, the web browser 110 is configured to display a web page 127, which includes a social interface 128 and web page content 129. For example, the web page content 129 may be an existing web page or other web-based content apart from the social interface 128. As shown in FIG. 1, the social interface 128 includes a flag interface 130, a tag interface 132, and a comment interface 134. The social interface 128 may be presented as a dialog box or other suitable interface element.

In one example, the social interface 128 may be provided in one HTML frame, while the web page content 129 is provided in another HTML frame. Other suitable methods for partitioning the social interface 128 and the web page content 129 may be similarly utilized. In another example, the social interface 128 may be included in a toolbar or other part of the web browser 110. In one embodiment, the social interface 128 is provided thorough a drop-down or pop-up window. In this way, the social interface 128 can be hidden until a user selects a social button or other suitable interface element. The social button may be sized and presented in a non-interfering manner on existing web pages (e.g., displayed on a corner of a web page). Other ways for providing the social interface 128 through the web browser 110 may be similarly utilized.

Upon accessing the social interface 128, a user may flag, tag, and/or comment on a web page as the web page is displayed on the web browser 110. As used herein, a flag refers to a designation associating a web page to a user. The flag may serve many purposes as contemplated by those skilled in the art. In one example, the flag may provide a way for a user to retrieve a web page again at a later time. In another example, the flag may provide an indication that a web page is significant to a given user. In this case, multiple flags may be associated with a single web page to indicate a popularity or importance of the web page to a larger number of users.

Although only one flag may be generated by a user for any single web page, the user may generate multiple flags, each of which is associated with a different web page. Further, multiple flags, each of which is associated with a different user, may be generated for a single web page. The flags may be stored on the user profile database 112 of the server computer 102. For example, the flags associated with the first user may be stored in the first flag storage 118, and the flags associated with the second user may be stored in the second flag storage 122.

In one embodiment, a user may generate a flag for a web page via the flag interface 130 within the social interface 128. The flag interface 130 may include a suitable interface element for flagging a web page if the web page is not flagged or another interface element for de-flagging the web page if the web page is already flagged. For example, the flag interface 130 may display a flag button if the web page is not flagged and a de-flag button if the web page is already flagged. If the flag button is displayed and the user selects the flag button for a web page, then a flag is generated for the web page and stored in the user profile database 112. The flag button is then replaced by the de-flag button. If the de-flag button is displayed and the user selects the de-flag button for a web page, then the corresponding flag stored in the user profile database 112 is deleted from the user profile database 112, and the de-flag button is replaced by the flag button. In one embodiment, other users who have flagged each given web page may also be displayed. In this way, the user viewing the web page can view other users sharing a like interest in the web page.

As used herein a comment refers to a communication made by the user with regards to a web page. A user may provide multiple comments for a single web page, and multiple users may each provide comments for a single web page. Further, a single user may provide comments for multiple web pages. The comments may be stored on the user profile database 112 of the server computer 102. For example, the comments associated with the first user may be stored in the first comment storage 120, and the comments associated with the second user may be stored in the second comment storage 124.

In one embodiment, a user may generate comments via the comment interface 134 within the social interface 128. The comment interface 134 may include a suitable interface element enabling a user to comment on a given web page. For example, the comment interface 134 may include a text entry box for entering comments. Once a user enters comments via the text entry box, the comment interface 134 may display the user's comments along with comments from other users. Each comment displayed in the comment interface 134 may display, among other information, the name of the user who made the comment, the date in which the comment was made, and/or the time in which the comment was made. In this way, a user may view comments made by other users and even create a conversation with the other users within the comment interface 134.

As used herein, a tag refers to a designation associating a keyword, which contains one or more words, to a given web page. The keyword may include arbitrary keywords generated by users and/or managed keywords generated by the organization operating the server computer 102 or another entity. The managed keywords may include commonly used keywords, trademarks, and trade names. Providing managed keywords may prevent misspellings or multiple spellings or versions of certain keywords entered by users. The tags and corresponding keywords may be stored in the social tagging database 126 of the server computer 102. In one embodiment, the keywords provide a way for users to search for and browse web pages. In particular, a suitable search engine (not shown)

may be operatively coupled to the social tagging database 126 to search for web pages based on keywords. Popular keywords may also be easily determined by searching for keywords associated with a larger number of tags.

In one embodiment, a user may associate a keyword with a web page via the tag interface 132. The tag interface 132 may include a suitable interface element enabling a user to create a keyword and/or select a keyword from a list of managed keywords and other previously-generated keywords. Also, a suggested keyword may be provided to the user as the user enters the keyword into the tag interface 132. For example, the tag interface 132 may include a text entry box configured with an autocomplete feature that predicts the keyword as the user enters characters into the text entry box. The autocomplete feature may complete a partially entered keyword with the full keyword. The autocomplete feature may also replace entered characters with a keyword. For example, the autocomplete feature may replace an abbreviation with the keyword associated with the abbreviation.

It should be appreciated that the social interface 128 may adjust portions of the flag interface 130, tag interface 132, and/or the comment interface 134 based on functionality provided by the web page itself. In one example, a given web page may provide a text entry box for entering comments. In this case, the comment interface 134 may be adjusted to provide a link to the web page-provided text entry box. In another example, a given web page may provide a link to a message board for discussing the web page. In this case, the comment interface 134 may be adjusted to provide the link to the message board. In both examples, the comment interface 134 is adjusted to prevent unnecessary duplication of comments on the web page. The flag interface 130 and the tag interface 132 may be similarly adjusted as contemplated by those skilled in the art.

By storing the flagging, tagging, and commenting information on the server computer 102, an organization can easily manage and share the information about multiple web pages with users on the private computer network. In one example, the organization can easily compare the number of flags associated with one web page with the flags associated with another web page to determine which web page is more popular among users of the private computer network. In another example, the organization can easily distribute managed tags through the social tagging database 126 and the tag interface 132. In yet another embodiment, the organization can easily control and delete comments that contain profanity. If, in the alternative, each web page provided its own comment section, then each web page would have to be separately monitored, which can be difficult and time-consuming.

Figure 2:
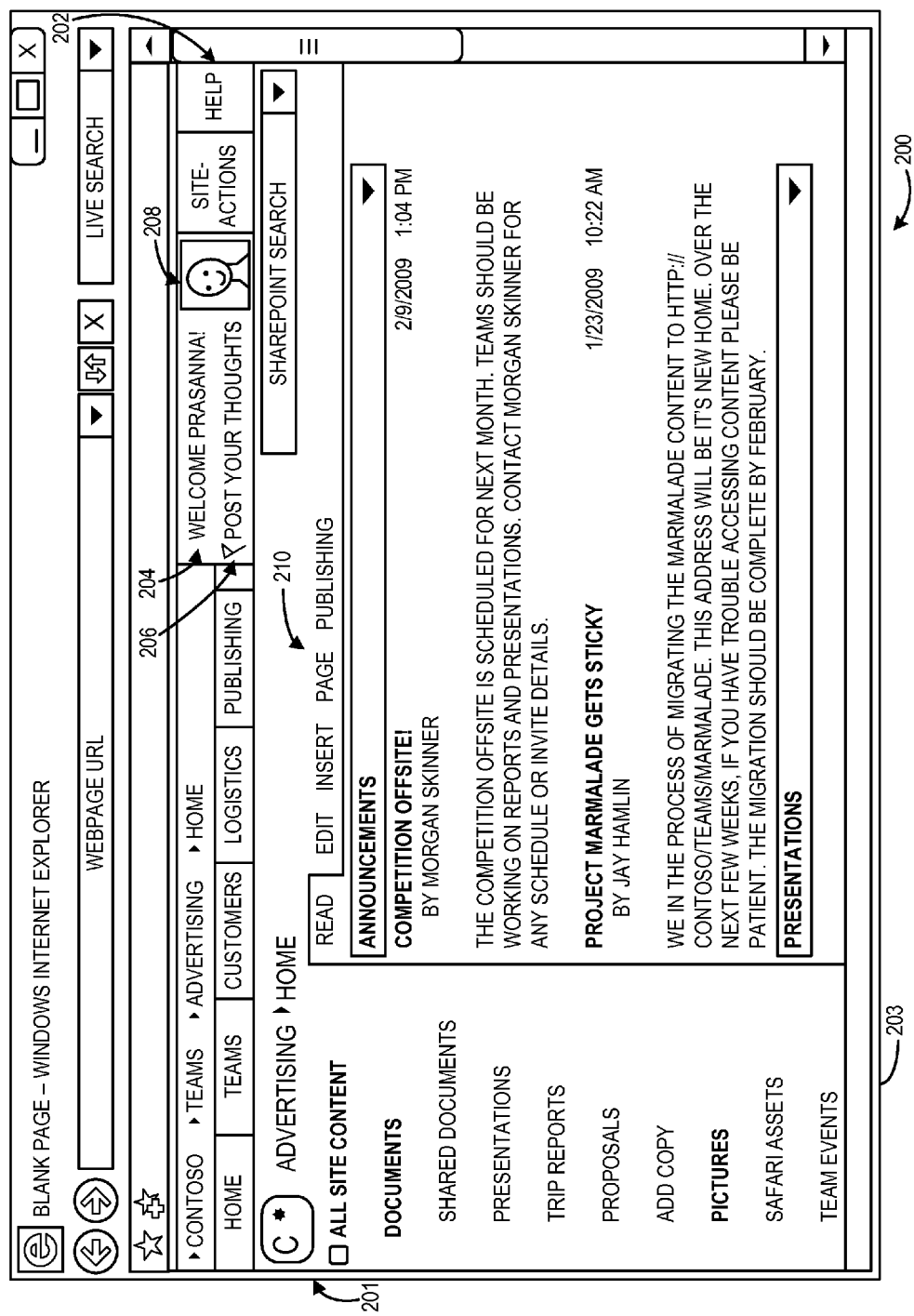
FIGS. 2-9 are screen display diagrams showing various implementations of a web page and a social interface, in accordance with embodiments.

FIGS. 2-9 are screen display diagrams showing illustrative screen displays provided by the web browser 110 in various embodiments presented herein. In particular, FIGS. 2-9 show an illustrative implementation of the social interface 128 as a dialog box. It should be appreciated that interface elements may be utilized to represent the social interface 128 as contemplated by those skilled in the art. Referring now to FIG. 2, additional details regarding the social interface 128 in one embodiment will be presented with reference to a screen display 200. The screen display 200 illustrates an exemplary implementation of a web page 201 including a social menu 202 as rendered by a web browser 203. The web page 201 is an illustrative example of the web page 127, and the web browser 203 is an illustrative example of the web browser 110. The social menu 202 includes a name portion 204, a social button 206, and a picture 208. As illustrated in FIG. 2, the name portion 204 indicates a user named "Prasanna" (hereinafter "user Prasanna") and the picture 208 is a photograph of the user Prasanna. Other representations of the user Prasanna may be similar utilized. The user Prasanna may be logged into server computer 102 via the web server 108. The web page 201 also includes web page content 210, which is an illustrative example of the web page content 129. In one embodiment, the web page 201 originally includes only the web page content 210 and is subsequently altered to include both the social menu 202 and the web page content 210. Although not so illustrated in FIG. 2, it should be illustrated that the social menu 202 may also be provided by the web browser 203. For example, a web browser plug-in may be installed on the web browser 203 to include the social menu 202.

Figure 3:
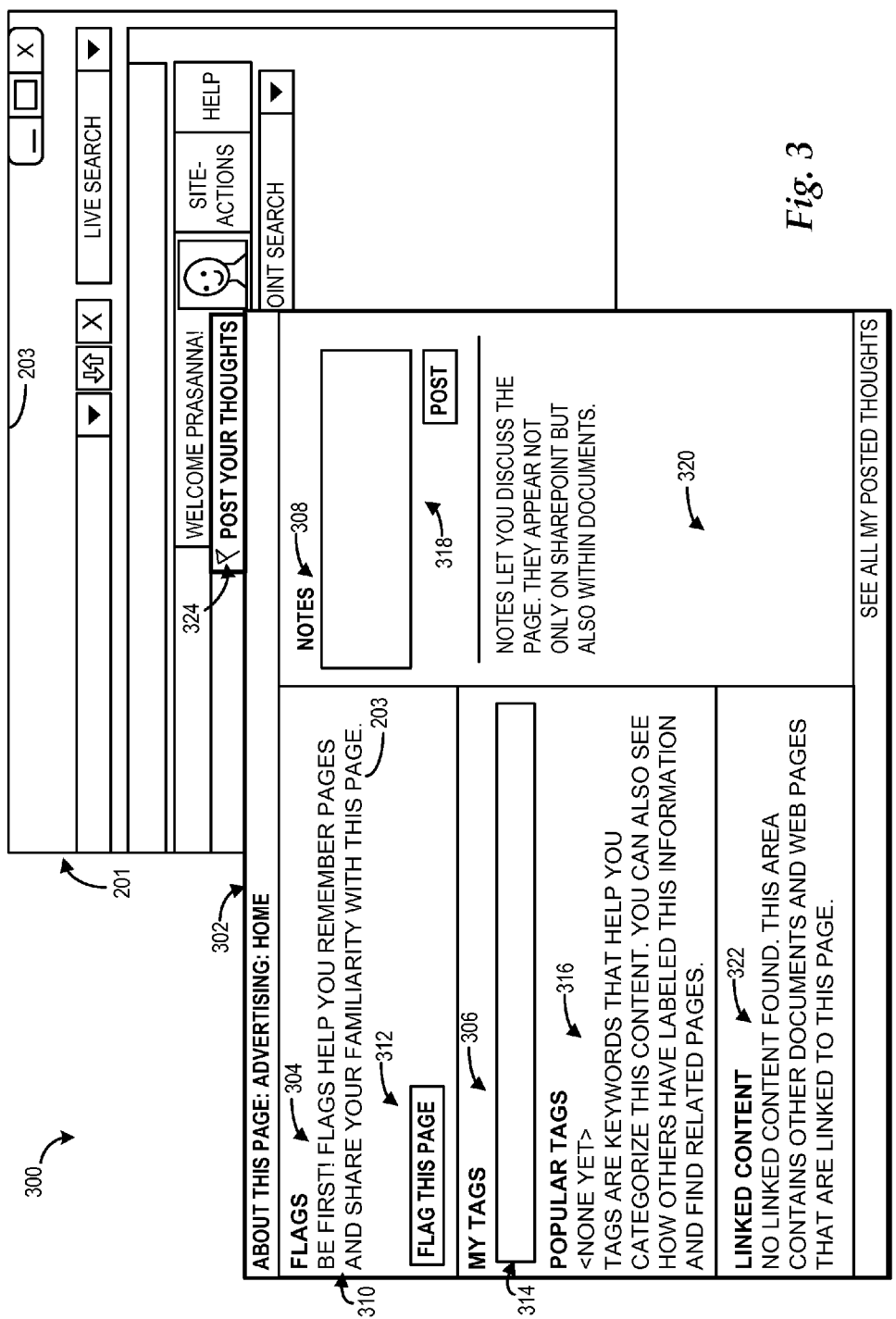

The user Prasanna may select the social button 206 in order to display the social interface 128 with respect to the web page 201. For example, the user Prasanna may select the social button 206 using a mouse or other suitable user input device. Upon selecting the social button 206, the web browser 203 may render the social interface 128. Referring now to FIG. 3, additional details regarding the social interface 128 in one embodiment will be presented with reference to screen display 300. The screen display 300 illustrates an exemplary implementation of a dialog box 302 as rendered by the web browser 203. The dialog box 302 is am illustrative example of the social interface 128. The dialog box 302 includes a flag section 304, a tag section 306, and a comments section 308.

The flag section 304 is an illustrative example of the flag interface 130. The flag section 304 includes a flag display portion 310 and a flag button 312. In one embodiment, the flag display portion 310 displays the pictures of users who have flagged the web page 201. As illustrated in FIG. 3, no pictures are displayed in the flag display portion 310 because no users have flagged the web page 201 yet. In one embodiment, the flag button 312 is displayed because the user Prasanna has not flagged the web page 201. If the user Prasanna selects the flag button 312, then the picture 208 or other suitable representation of the user Prasanna is displayed in the flag display portion 310, and the flag button 312 is replaced with a de-flag button (not shown).

The tag section 306 is an illustrative example of the tag interface 132. The tag section 306 includes a text entry box 314 and a popular tags portion 316. In one embodiment, the text entry box 314 displays keywords associated with the web page 201 that were previously entered by the user Prasanna. The text entry box 314 may also enable users, such as the user Prasanna, to enter keywords and associated the keywords with the web page 201. As illustrated in FIG. 3, no entries are shown in the text entry box 314 because the user Prasanna has not entered any keywords yet for the web page 201. In one embodiment, the popular tags portion 316 displays one or more popular keywords created by users of the server computer 102. Keywords may be deemed popular by any suitable standard. For example, a keyword may be popular with respect to the web page 201 because a certain number of users have associated the keyword with the web page 201. As illustrated in FIG. 3, no entries are shown in the popular tags portion 316 because no users have entered any keywords yet for the web page 201.

The comments section 308 is an illustrative example of the comment interface 134. The comments section 308 includes a text entry box 318 and a comments display portion 320. In one embodiment, the text entry box 318 enables a user, such as the user Prasanna, to enter comments associated with the web page 201. The comments display portion 320 displays comments previously entered by the user Prasanna and other users of the server computer 102. As illustrated in FIG. 3, no entries are shown in the comments display portion 320 because no comments have been entered yet for the web page 201.

The dialog box 302 further includes a linked content section 322 and a flag icon 324. In one embodiment, the linked content section 322 displays links to web pages and other documents that include a link to the web page 201. This type of functionality is commonly referred to as linkback or trackback. The links displayed in the linked content section 322 may be manually compiled or automatically compiled via a suitable linkback protocol. As illustrated in FIG. 3, no links are shown in the linked content section 322 because no web pages or other documents link to the web page 201. In one embodiment, the flag icon 324 is an interface element indicating whether a user has already flagged a given web page. In particular, the flag icon 324 is highlighted if the user Prasanna flags the web page 201. Also, the highlight on the flag icon 324 may be removed if the user Prasanna de-flags the web page 201.

Figure 4:
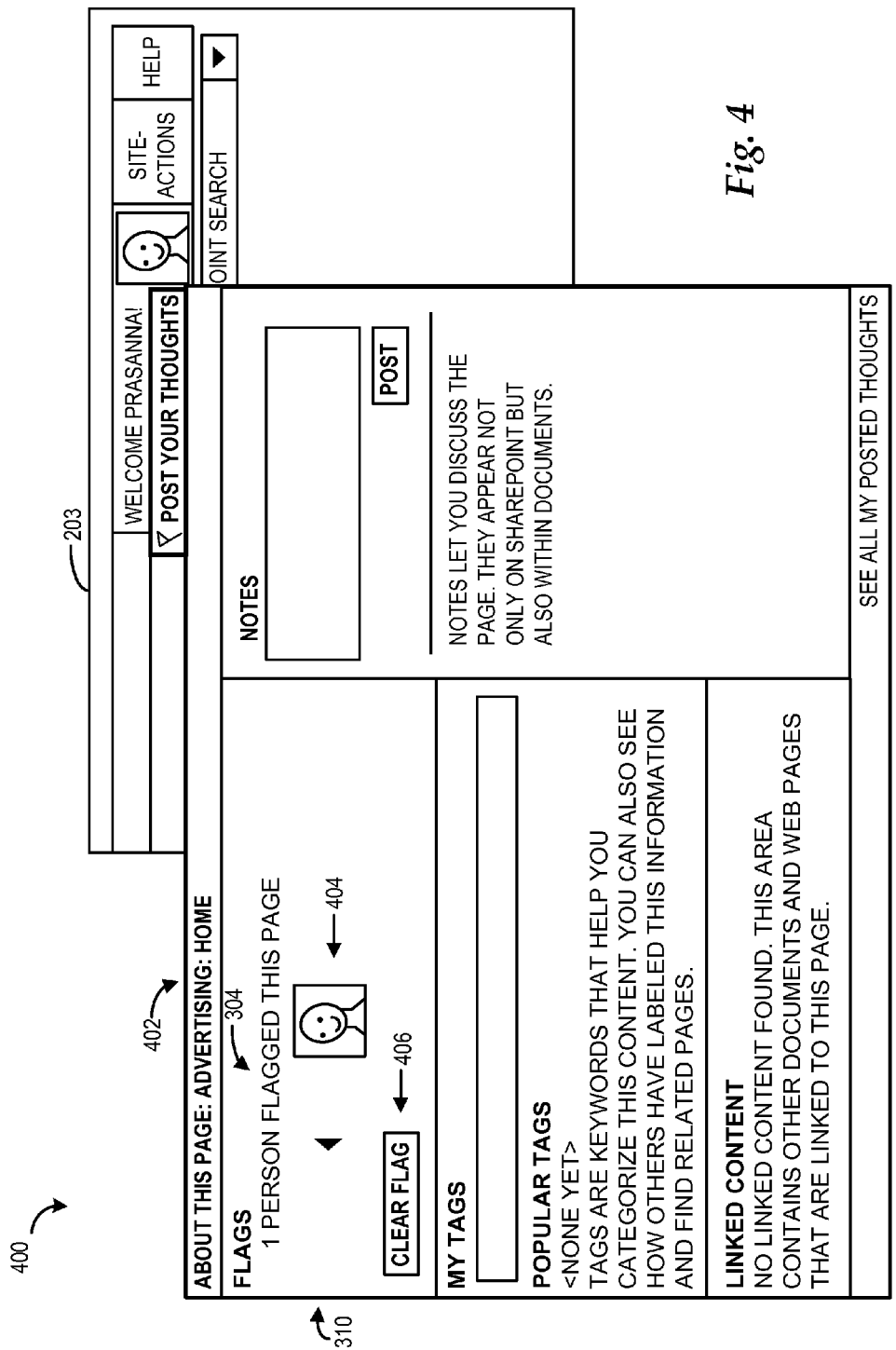

Referring now to FIG. 4, additional details regarding the social interface 128 in one embodiment will be presented with reference to a screen display 400. The screen display 400 illustrates an exemplary implementation of a dialog box 402 as rendered by the web browser 203 after the user Prasanna flags the web page 201 by selecting the flag button 312. As previously mentioned, the user Prasanna may select the flag button 312 via a mouse or other suitable input device. The dialog box 402 illustrates a picture 404 within the flag display portion 310 of the flag section 304. The picture 404 is photograph of the user Prasanna similar to the picture 208. Other representations of the user Prasanna may be similar utilized.

The dialog box 402 further illustrates a de-flag button 406 within the flag section 304. In one embodiment, the de-flag button 406 replaces the flag button 312 once the user Prasanna flags the web page 201 by selecting the flag button 312. The user Prasanna may select the de-flag button 406 to remove the flag associated with the web page from the user profile database 112. Once Prasanna selects the de-flag button 406, the picture 404 may be removed from the flag section 304, and the de-flag button 406 may be replaced with the flag button 312.

Figure 5:
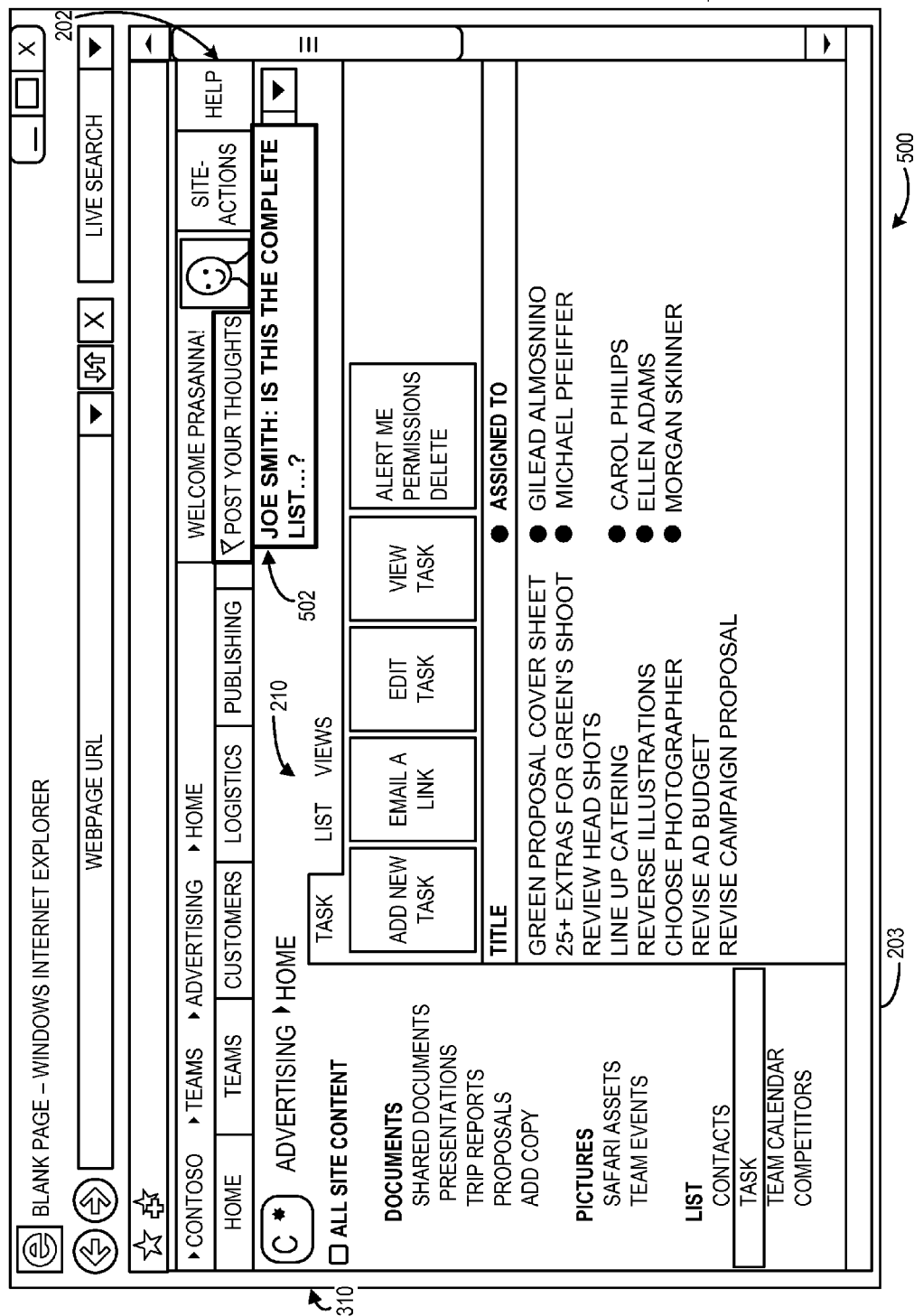

Referring now to FIG. 5, additional details regarding the social menu 202 in one embodiment will be presented with reference to a screen display 500. The screen display 500 displays a toast message 502 near the social menu 202. In one embodiment, the toast message 502 is displayed within the web browser 203 when another user flags, tags, and/or comments on the web page 201. The toast message 502 may be displayed within a pop-up window that opens and closes automatically within a predefined duration. As shown in FIG. 5, the toast message 502 includes at least a portion of the comment made by another user named "Jimm Ross" (hereinafter "user Jimm") about the web page 201. In other embodiments, the toast message 502 may include any suitable information regarding a flag, tag, or comment made by another user with respect to a particular web page.

In one embodiment, the toast message 502 is displayed for a web page, such as the web page 201, when the web page is displayed on the web browser 203. In this case, the toast message 502 may display updates on flags, tags, and comments about the web page 201 since the last time the user viewed the web page 201. In another embodiment, the user may select the web pages for which toast messages are displayed. The user may configure, among other things, the duration of the toast message 502 and the location of the toast message 502 within the web browser 203. The user may also shut off the toast message functionality such that the toast message 502 does not display on the web browser 203. In one embodiment, the pop-up window displaying the toast message 502 is selectable by a user. For example, by selecting the toast message 502 via a mouse or other suitable input device, the user may access the social interface 128 to view the full comment made by the user Jimm.

Figure 6:
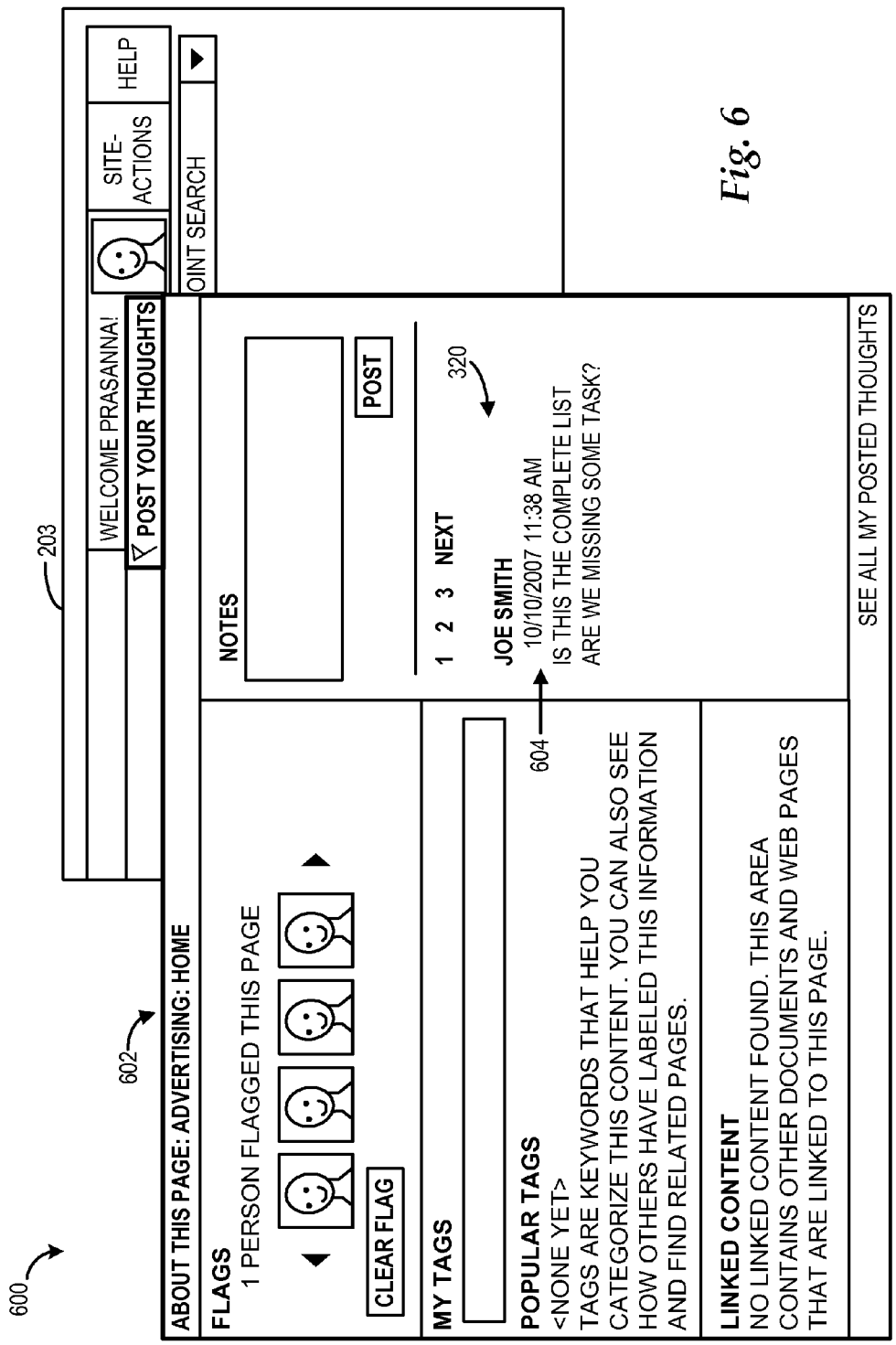

Referring now to FIG. 6, additional details regarding the toast message 502 displayed within the web browser 203 in one embodiment will be presented with reference to a screen display 600. The screen display 600 illustrates an exemplary implementation of a dialog box 602 after a user selects the toast message 502 via a mouse or other suitable input device. The dialog box 602 shows multiple messages in the comments display portion 320. In particular, the comments display portion 320 illustrates a comment 604 made by the user Jimm that includes the same text displayed within the toast message 502.

Figure 7:
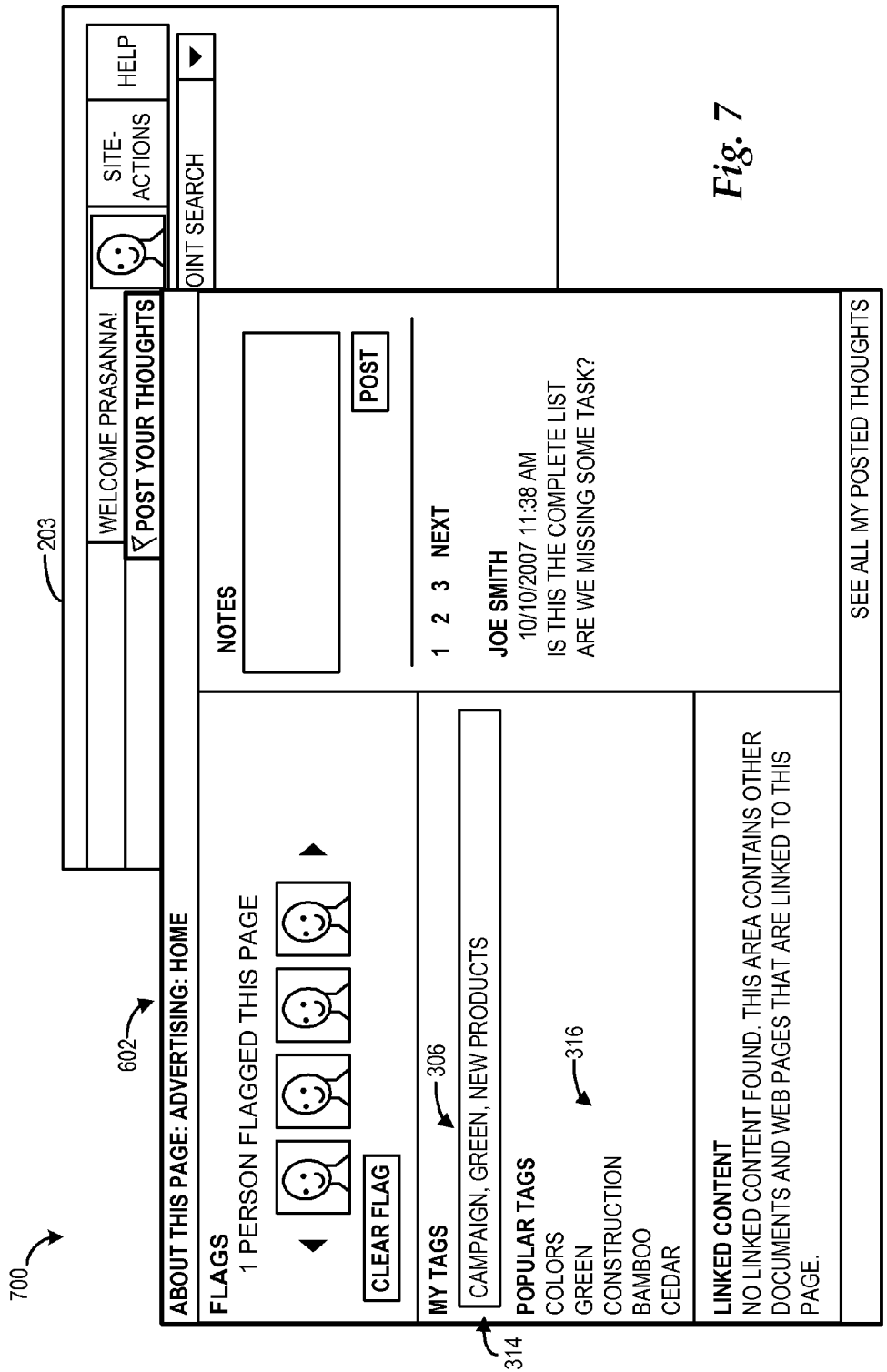

Referring now to FIG. 7, additional details regarding the tag section 306 displayed within the web browser 203 in one embodiment will be presented with reference to a screen display 700. The screen display 700 illustrates a number of keywords that the user Prasanna entered into the text entry box 314. As illustrated in FIG. 7, the text entry box 314 shows the keywords "campaign," "green," and "new products." As previously described, keywords entered into the text entry box 314 may be aided by an autocomplete feature. The popular tags portion 316 shows multiple keywords that are deemed popular including the keyword "green," which is also included in the text entry box 314. In one embodiment, each of the keywords displayed in the text entry box 314 and the popular tags portion 316 may be selectable by a user. For example, a user may select one of the keywords using a mouse or other suitable input device. Selecting one of the keywords may access any suitable information regarding the keyword, such as a list of web pages associated with the keyword or a list of users who have associated the keyword to the web page 201.

Figure 8:
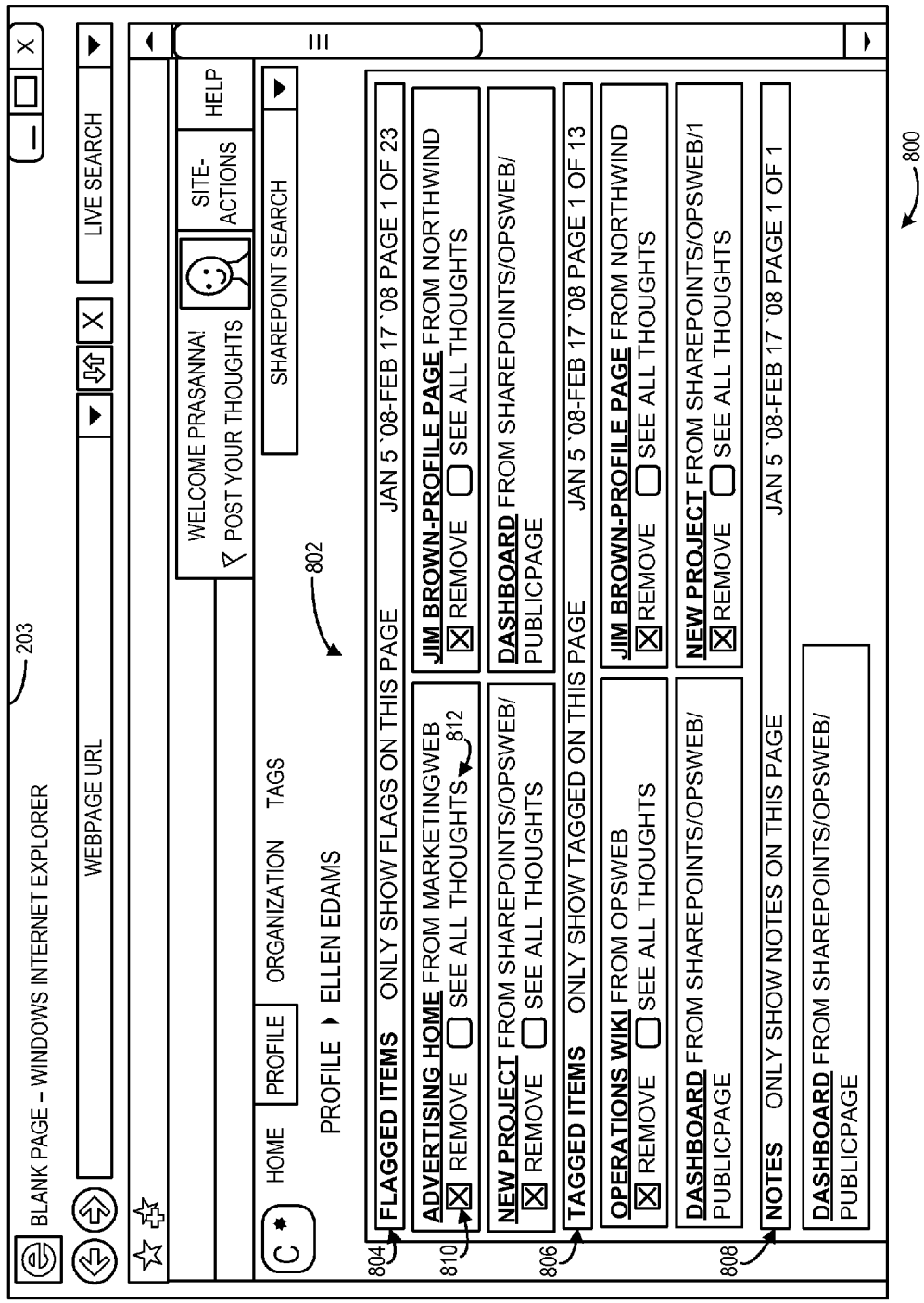

Referring now to FIG. 8, additional details regarding the social interface 128 in one embodiment will be presented with reference to a screen display 800. The screen display 800 illustrates an exemplary implementation of a profile page 802 for another user named "Ellen Adams" (hereinafter user "Ellen"). In one embodiment, the profile page 802 may be accessed by selecting a picture associated with the user Ellen via a mouse or other suitable input device. For example, a picture associated with the user Ellen may be displayed in the flag display portion 310.

As illustrated in FIG. 8, the profile page 802 includes a flagged items section 804, a tagged items section 806, and a comments section 808. The flagged items section 804 includes a list of web pages flagged by the user Ellen. The tagged items section 806 includes a list of web pages with which the user Ellen associated tags, and the comments section 808 includes a list of web pages in which the user Ellen entered comments. In one embodiment, each entry listed in the flagged items section 804, the tagged items section 806, and the comments section 808 includes a remove button 810 and a thoughts button 812. Selecting the remove button 810 removes the particular entry from the profile page 802. Selecting the thoughts button 812 displays the social interface 128 as it relates to the web page associated with the particular entry.

Figure 9:
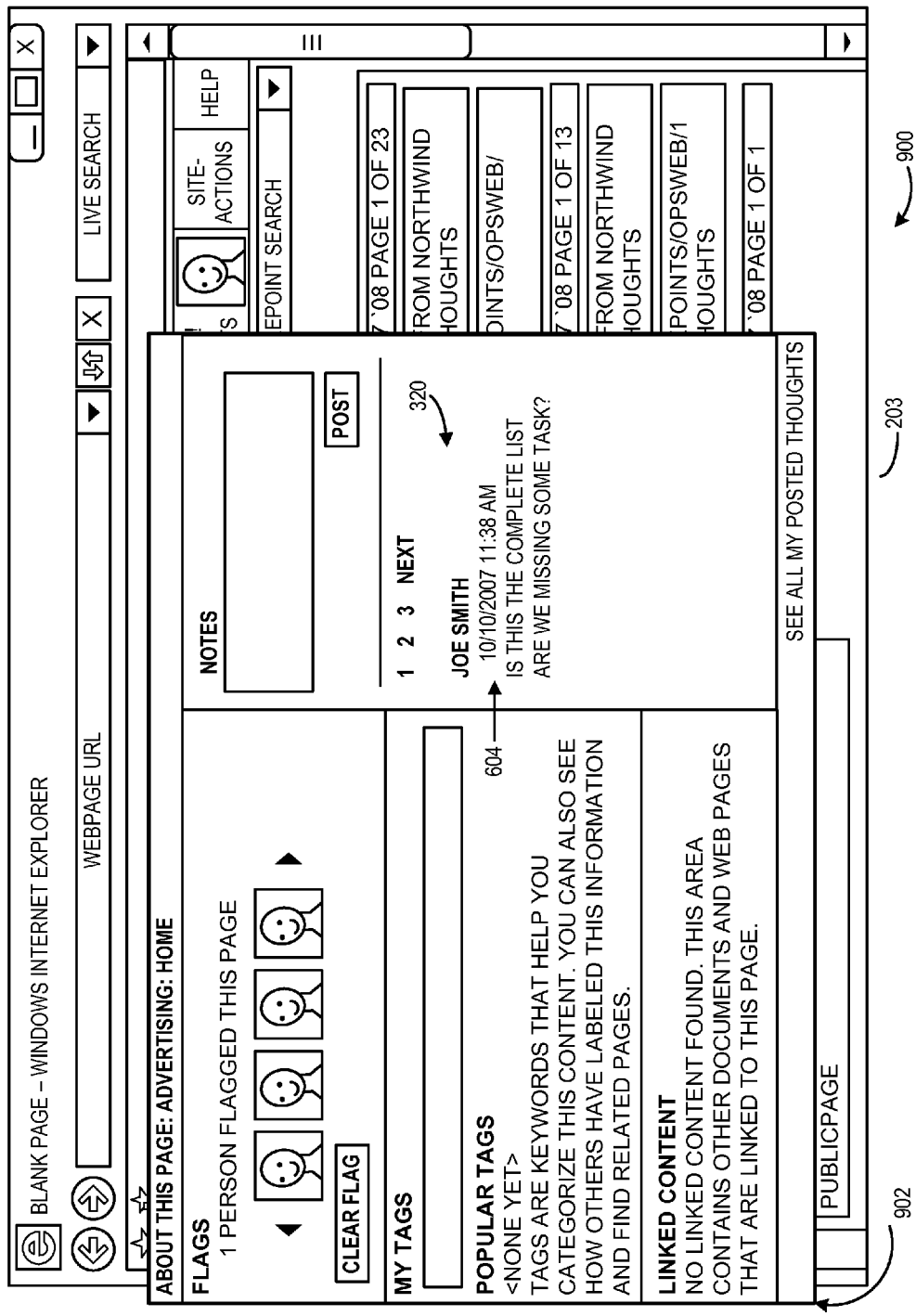

Referring now to FIG. 9, additional details regarding the social interface 128 in one embodiment will be presented with reference to a screen display 900. The screen display 900 illustrates an exemplary implementation of a dialog box 902 after a user selects the thoughts button 812. In particular, the thoughts button 812 is associated with the web page entitled "Advertising Home." The dialog box 902 shows flag, tag, and comment information related to the same web page as indicated at 904.

Figure 10:
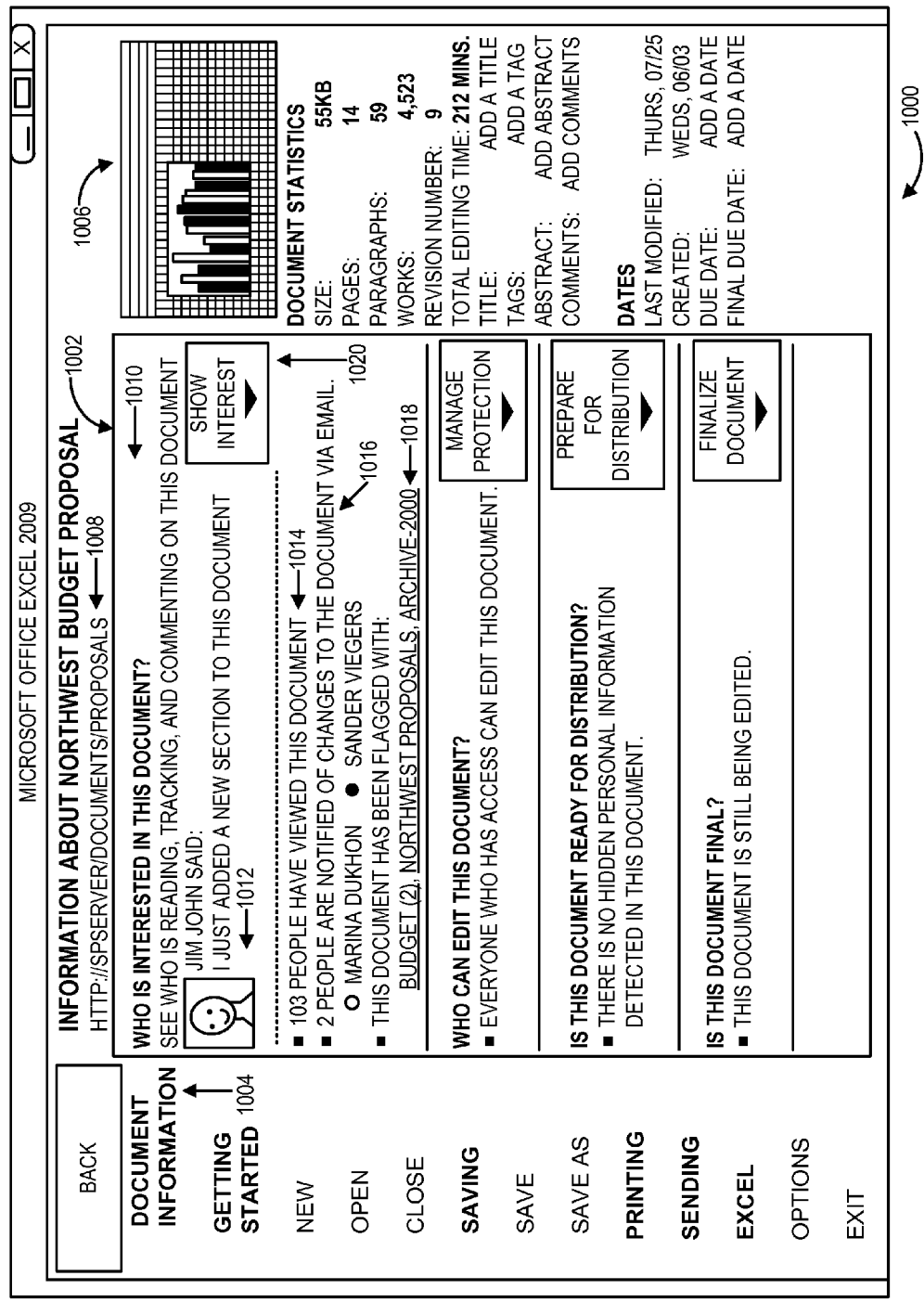
FIGS. 10-11 are screen display diagrams showing an implementation of a spreadsheet document viewer and a social interface, in accordance with one embodiment.
Figure 11:
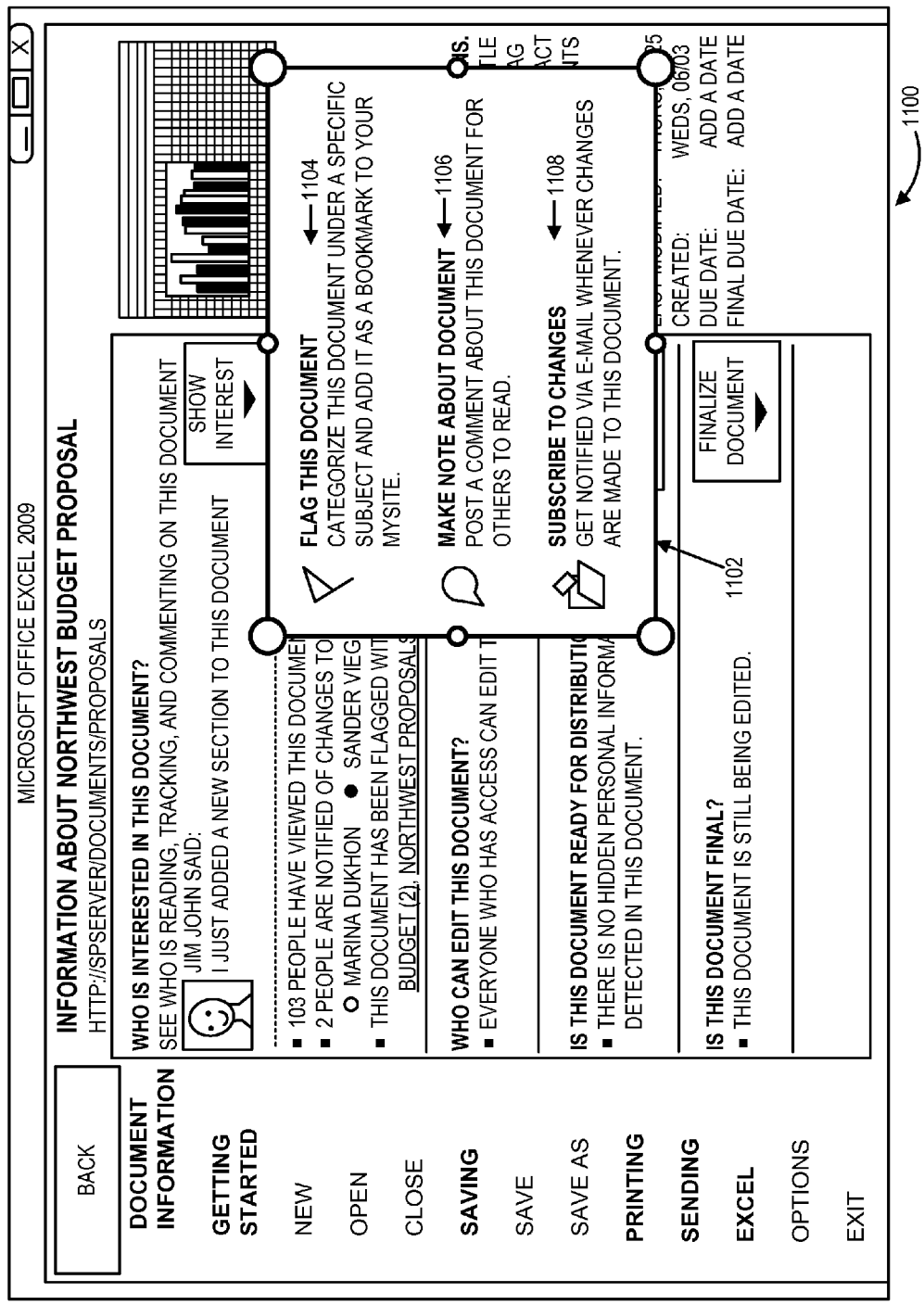

FIGS. 10-11 are screen display diagrams shown illustrative screen displays provided by a client-side spreadsheet document viewer in various embodiments presented herein. In particular, FIG. 10 illustrates one embodiment of an interface element for accessing a social interface, and FIG. 11 illustrates one embodiment of a social interface once the interface element has been selected. Although not so limiting, FIGS. 10 and 11 primarily refer to a social interface included in a client-side spreadsheet document viewer adapted for viewing spreadsheet documents. It should be appreciated the social interface may be similar included in any client-side office productivity applications as well as other suitable computer applications.

Referring now to FIG. 10, additional details regarding the social interface 128 in one embodiment will be presented with reference to a screen display 1000. The screen display 1000 illustrates a document information section 1002 upon receiving a selection of a document information button 1004. The document information section 1002 is directed towards a particular spreadsheet document, which is previewed at a preview window 1006. That is, each separate document may have its own document interface section. As illustrated in FIG. 10, a uniform resource locator ("URL") associated with the spreadsheet document is shown at 1008. The document information section 1002 includes, among other features, a social interface section 1010, which displays a variety of useful information about the particular spreadsheet document with respect to other users in a private computer network. The social interface section 1010 includes a comment view section 1012 displaying recent comments from other users, a number views section 1014 displaying the number of users who have viewed the particular spreadsheet document, a subscriber view section 1016 displaying the number of users who have subscribed to email updates regarding the particular spreadsheet document, and a flag view section 1018 displaying users who have flagged the particular spreadsheet. Although not so illustrated in FIG. 10, the document information section 1002 may further include a tag view section (not shown) for viewing tags in other embodiments.

The document information section 1002 further includes a show interest button 1020. Instead of a button, it should be appreciated that other interface elements may be similarly utilized. In one embodiment, selecting the show interest button 1020 enables a user to create her own flags, tags, and comments with respect to the particular spreadsheet document. Referring now to FIG. 11, additional details regarding the social interface 128 in one embodiment will be presented with reference to a screen display 1100. The screen display 1100 illustrates a dialog box 1102, which is displayed in response to a user selecting the show interest button 1020. The dialog box 1102 includes a flag button 1104, a comment button 1106, and a subscribe button 1108. A user may select the flag button 1104 to flag the particular spreadsheet document. Upon flagging the spreadsheet document, the user may be added to the flag view section 1018. A user may select the comment button 1106 to add comments about the particular spreadsheet document. Upon commenting on the spreadsheet document, the user's comments may be added to the comment view section 1012. A user may select the subscribe button 1110 to subscribe to emails notifications of changes made to the particular spreadsheet document. In this way, the user can be notified whenever other users make any changes to the spreadsheet document. Upon subscribing to email notifications, the user may be added to the subscriber view section 1016.

The document information section 1002 provides a central location containing a variety of information for users to quickly determine, among other things, the popularity of a document in terms of views, other users who may find the document interesting (e.g., users who have flagged or subscribed to the document), and comments by other users about the document. In one embodiment, a client-side computer application is adapted to display the document information section 1002. In this way, a user is provided with a much richer experience for viewing office productivity documents, such as word processing documents, spreadsheet documents, and presentation documents, as well as other suitable documents over a private computer network. Additionally, the user is provided a single interface within the document itself for displaying the flags, tags, and comments. In this way, the user can view flags, tags, and comments from other users without accessing an external web page or other external application. In contrast, conventional client-side computer applications do not provide a way to flag, tag, and comment on documents, as well as to easily share and view user-created flags, tags, and comments over a private computer network.

Figure 12:
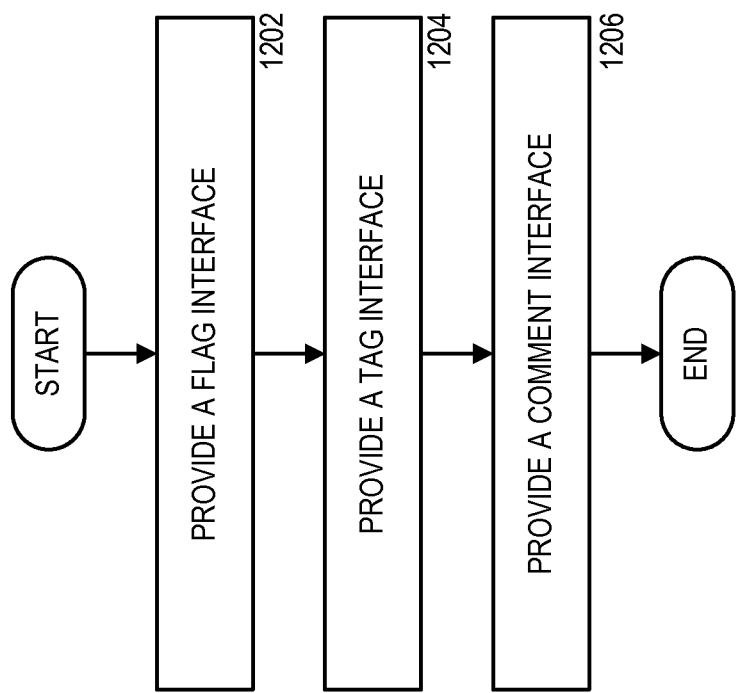
FIG. 12 is a flow diagram showing an illustrative process for providing an improved user interface enabling users to interact with documents, in accordance with one embodiment.

Referring now to FIG. 12, additional details will be provided regarding the embodiments presented herein for providing an improved user interface for interacting with documents and sharing information associated with the documents with other users of a private computer network, such as an intranet. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 12, a routine 1200 begins at operation 1202 where a social interface, such as the social interface 128, is provided via a suitable document viewer. Examples of document viewers may include a web browser, such as the web browser 110, and a spreadsheet document viewer, as illustrated in FIGS. 10 and 11. The social interface 128 provides a flag interface, such as the flag interface 130. In one embodiment, the flag interface 130 enables a user to flag a particular document, such as the web page 201 or the spreadsheet document illustrated in FIGS. 10 and 11. The flag interface 130 may also display flags generated by other users for the document. The user may generate multiple flags for multiple document. The flags may be saved on the user profile database 112 of the server computer 102. Conventional bookmarks are typically stored on the client computer 104 and not easily shared with other users of the private computer network. In contrast, the flags saved on the user profile database 112 are easily retrieved by a client computer connected to the server computer 102.

The routine 1200 proceeds to operation 1202 where the document viewer, such as the web browser 110, provides a tag interface, such as the tag interface 132. In one embodiment, the tag interface 132 enables a user to associate a keyword with a particular document, such as the web page 201 or the spreadsheet document illustrated in FIGS. 10 and 11. The keyword may be an arbitrary keyword or a managed keyword stored in the social tagging database 126. An arbitrary keyword refers to a keyword created by the user. A managed keyword refers to a keyword that is generated by an organization operating the server computer 102 or another entity. The managed keyword may be a commonly used keyword, a trademark, or a trade name associated with an organization. By storing keywords in the social tagging database 126, an organization can easily add and delete keywords. The tag interface 132 may include a text entry box, such as the text entry box 314, where a user can enter a keyword. The text entry box 314 may be adapted with an autocomplete feature to aid the user in entering the keyword. In another embodiment, the tag interface 132 may enable a user to subscribe to emails updates that are sent when any changes are made to a document.

The routine 1200 proceeds to operation 1204 where the document viewer, such as the web browser 110, provides a comment interface, such as the comment interface 134. In one embodiment, the comment interface 134 enables a user to enter comments regarding a particular document. The comment interface 134 may include a text entry box, such as the text entry box 318, where a user can enter a comment. The comment interface 134 may also include a comments display portion 320 for displaying comments made by users of the private computer network. The comment interface 134 may enable users of the private computer network to engage in a discussion of the document even if the document itself does not provide commenting functionality.

The comments generated by users via the comment interface 134 may be stored in the user profile database 112 of the server computer 102. By storing the comments on the server computer 102, an organization operating the server computer 102 can easily monitor and manage the comments made about the documents. For example, comments that include profanity may be easily discovered and deleted by monitoring certain terms stored in the user profile database 112.

Figure 13:
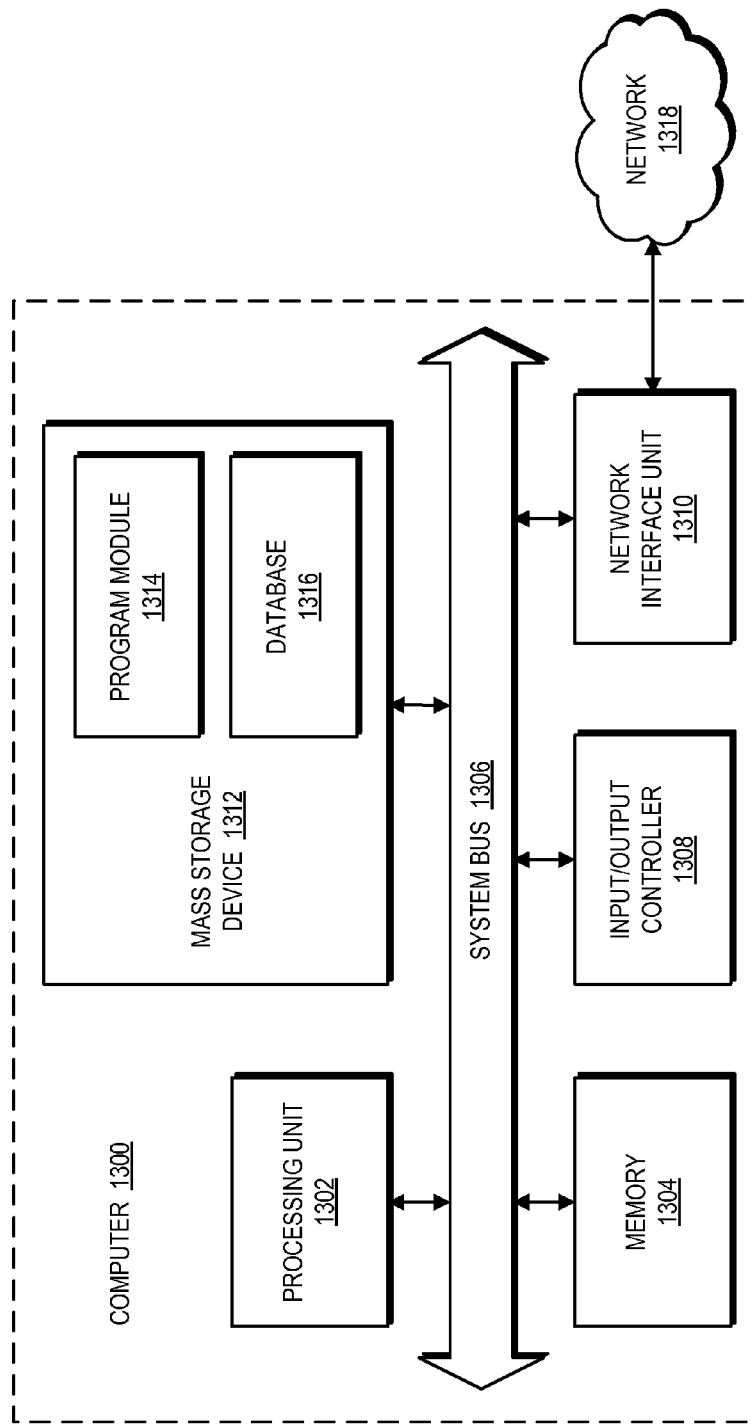
FIG. 13 is a computer architecture diagram showing aspects of an illustrative computer hardware architecture for a computing system capable of implementing aspects of the embodiments presented herein.

Referring now to FIG. 13, an exemplary computer architecture diagram showing aspects of a computer 1300 is illustrated. The computer 1300 includes a processing unit 1302 ("CPU"), a system memory 1304, and a system bus 1306 that couples the memory 1304 to the CPU 1302. The computer 1300 further includes a mass storage device 1312 for storing one or more program modules 1314 and one or more databases 1316. Examples of the program module 1314 include the web browser application 110 and other suitable document viewers. Examples of the databases 1316 include the user profile database 112 and the social tagging database 126. The mass storage device 1312 is connected to the CPU 1302 through a mass storage controller (not shown) connected to the bus 1306. The mass storage device 1312 and its associated computer-readable media provide non-volatile storage for the computer 1300. Although the description of computer-readable media contained herein refers to a mass storage device, such as a hard disk or CD-ROM drive, it should be appreciated by those skilled in the art that computer-readable media can be any available computer storage media that can be accessed by the computer 1300.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1300.

According to various embodiments, the computer 1300 may operate in a networked environment using logical connections to remote computers through a network 1318, such as the network 106. The computer 1300 may connect to the network 1318 through a network interface unit 1310 connected to the bus 1306. It should be appreciated that the network interface unit 1310 may also be utilized to connect to other types of networks and remote computer systems. The computer 1300 may also include an input/output controller 1308 for receiving and processing input from a number of input devices (not shown), including a keyboard, a mouse, a microphone, and a game controller. Similarly, the input/output controller 1308 may provide output to a display or other type of output device (not shown).

Based on the foregoing, it should be appreciated that technologies for providing an improved user interface for interacting with documents and sharing information about the documents with other users across an intranet or other private computer network are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing an improved interface for interacting with a document within a private computer network, comprising:
   receiving the document that provides a document interface and lacks an embedded flag interface, an embedded tag interface, and an embedded comment interface within the document interface;
   upon receiving the document, displaying the document in a document viewer configured to provide an external flag interface, an external tag interface, and an external comment interface for the document separate from the document interface;
   when displaying the document in the document viewer, utilizing the document viewer to provide the external flag interface for the document lacking the embedded flag interface, the external flag interface enabling a user of the private computer network to flag the document as the document is displayed by the document viewer without accessing an external flagging web page;
   when displaying the document in the document viewer, utilizing the document viewer to provide the external tag interface for the document lacking the embedded tag interface, the external tag interface enabling the user to associate a tag with the document as the document is displayed by the document viewer; and when displaying the document in the document viewer, utilizing the document viewer to provide the external comment interface for the document lacking the embedded comment interface, the external comment interface enabling the user to share comments about the document with other users of the private computer network as the document is displayed by the document viewer.

2. The method of claim 1, wherein the document viewer comprises a web browser and the document comprises a web page.

3. The method of claim 1, wherein the external flag interface, the external tag interface, and the external comment interface comprise external interfaces provided by the document viewer in addition to the document and separate from the document interface; and wherein the embedded flag interface, the embedded tag interface, and the external comment interface comprise embedded interfaces provided by the document within the document interface.

4. The method of claim 1, wherein the external flag interface, the external tag interface, and the external comment interface are provided by altering the document lacking the embedded flag interface, the embedded tag interface, and the embedded comment interface to include the external flag interface, the external tag interface, and the external comment interface.

5. The method of claim 1, wherein the external flag interface, the external tag interface, and the external comment interface are provided by the document viewer via a document viewer plug-in.

6. The method of claim 1, wherein the external flag interface, the external tag interface, and the external comment interface are provided in a dialog box displayed on the document viewer.

7. The method of claim 6, wherein the dialog box is hidden from display until the user selects an interface element provided by the document viewer.

8. The method of claim 1, wherein the external flag interface displays users who have flagged the document.

9. The method of claim 1, wherein the external tag interface comprises a first section for displaying tags that the user associated with the document and a second section displaying popular tags that users of the private computer network associated with the document, wherein the popular tags are a subset of tags that the users of the private computer network associated with the document.

10. The method of claim 1, wherein the external tag interface comprises a text entry box enabling the user to enter a partial tag, and wherein the external tag interface is configured with an autocomplete feature for predicting a new tag as the user enters characters into the text entry box and for automatically completing the partial tag to become the new tag.

11. The method of claim 1, wherein the external comment interface comprises a text dialog box enabling the user to enter a comment regarding the document and a comments display section displaying comments generated by users of the private computer network regarding the document.

12. The method of claim 1, further comprising providing a toast message feature for displaying a toast message within the document viewer upon another user flagging, tagging, or commenting on the document, the toast message textually displaying updated flags, tags, and comments since a last time the user viewed the document.

13. The method of claim 1, further comprising a linked content interface displaying other documents that link to the document.

14. A method for providing an improved interface for interacting with a web page within an intranet, comprising:
receiving the web page that provides a web page interface and lacks an embedded flag interface, an embedded tag interface, and an embedded comment interface within the web page interface;
upon receiving the web page, displaying the web page in a web browser configured to provide an external flag interface, an external tag interface, and an external comment interface for the web page separate from the web page interface;
when displaying the web page in the web browser, utilizing the web browser to provide the external flag interface in a first hypertext markup language (HTML) frame of the web page lacking the embedded flag interface, the external flag interface enabling a user of the intranet to flag the web page as the web page is displayed by the web browser without accessing an external flagging web page;
when displaying the web page in the web browser, utilizing the web browser to provide the external tag interface in the first HTML frame of the web page lacking the embedded tag interface, the external tag interface enabling the user to associate a tag with the web page as the web page is displayed by the web browser;
when displaying the web page in the web browser, utilizing the web browser to provide the external comment interface in the first HTML frame of the web page lacking the embedded comment interface, the external comment interface enabling the user to share comments about the web page with other users of the intranet as the web page is displayed by the web browser; and
providing web page content in a second HTML frame of the web page.

15. The method of claim 14, further comprising adjusting the external comment interface if the web page includes a separate comment section.

16. The method of claim 15, wherein adjusting the external comment interface comprises including in the external comment interface a link to the separate comment section.

17. The method of claim 14, further comprising providing a social menu, the social menu comprising a button for accessing a dialog box, the dialog box displaying the external flag interface, the external tag interface, and the external comment interface.

18. The method of claim 17, further comprising providing a flag icon within the social menu, the flag icon indicating whether the web page is flagged.

19. The method of claim 14, wherein the tag comprises an arbitrary tag created by the user or a managed tag created by an organization and selected by the user.

20. A computer-readable medium having computer-executable instructions stored thereon which, when executed by a computer, cause the computer to:
receiving a document that provides a document interface and lacks an embedded flag interface, an embedded tag interface, and an embedded comment interface within the document interface;
upon receiving the document, displaying the document in a document viewer configured to provide an external flag interface, an external tag interface, and an external comment interface for the document separate from the document interface;
when displaying the document in the document viewer, utilizing the document viewer to provide the external flag interface for the document lacking the embedded flag interface, the external flag interface enabling a user of a private computer network to flag the document as the document is displayed by the document viewer without accessing an external flagging web page;

when displaying the document in the document viewer, utilizing the document viewer to provide the external tag interface for the document lacking the embedded tag interface, the external tag interface enabling the user to associate a tag with the document as the document is displayed by the document viewer;

when displaying the document in the document viewer, utilizing the document viewer to provide the external comment interface for the document lacking the embedded comment interface, the external comment interface enabling the user to share comments about the document with other users of the private computer network as the document is displayed by the document viewer;

wherein the external tag interface comprises a first section for displaying tags that the user associated with the document and a second section displaying popular tags that users of the private computer network associated with the document, the popular tags are a subset of tags that the users of the private computer network associated with the document; and wherein the external comment interface comprises a text dialog box enabling the user to enter a comment regarding the document and a comments display section displaying comments generated by users of the private computer network regarding the document.

* * * * *